United States Patent
Kim

(10) Patent No.: US 10,984,210 B2
(45) Date of Patent: Apr. 20, 2021

(54) FINGERPRINT SENSOR OF ELECTRONIC DEVICE

(71) Applicant: SAMSUNG ELECTRONICS CO., LTD., Suwon-si (KR)

(72) Inventor: Dongkyun Kim, Suwon-si (KR)

(73) Assignee: SAMSUNG ELECTRONICS CO., LTD., Suwion-si (KR)

(*) Notice: Subject to any disclaimer, the term of this patent is extended or adjusted under 35 U.S.C. 154(b) by 0 days.

(21) Appl. No.: 16/412,619

(22) Filed: May 15, 2019

(65) Prior Publication Data

US 2020/0184172 A1    Jun. 11, 2020

(30) Foreign Application Priority Data

Dec. 10, 2018  (KR) .................. 10-2018-0158380

(51) Int. Cl.
  *G06K 9/00*  (2006.01)
  *G06F 3/043*  (2006.01)
  *G06F 3/041*  (2006.01)

(52) U.S. Cl.
  CPC ........... *G06K 9/0002* (2013.01); *G06F 3/043* (2013.01); *G06F 3/0416* (2013.01)

(58) Field of Classification Search
  CPC combination set(s) only.
  See application file for complete search history.

(56) References Cited

U.S. PATENT DOCUMENTS

| | | | |
|---|---|---|---|
| 7,411,581 B2 | 8/2008 | Hardie-Bick | |
| 8,378,974 B2 | 2/2013 | Aroyan et al. | |
| 9,323,393 B2 | 4/2016 | Djordjev et al. | |
| 9,815,087 B2 | 11/2017 | Ganti et al. | |
| 9,984,270 B2 | 5/2018 | Yousefpor et al. | |
| 9,984,271 B1 | 5/2018 | King et al. | |
| 10,198,610 B1* | 2/2019 | Yousefpor | G06F 3/0488 |
| 2015/0009185 A1* | 1/2015 | Shi | G06F 3/0436 |
| | | | 345/177 |

(Continued)

FOREIGN PATENT DOCUMENTS

JP    6101864 B2    3/2017

OTHER PUBLICATIONS

Kent, "New Touch Technology from Time Reversal Acoustics: A History", IEEE International Ultrasonics Symposium Proceedings, 2010, pp. 1173-1178, 6 pages total.

(Continued)

*Primary Examiner* — Temesghen Ghebretinsae
*Assistant Examiner* — Sosina Abebe
(74) *Attorney, Agent, or Firm* — Sughrue Mion, PLLC

(57) ABSTRACT

A fingerprint sensor of an electronic device includes a plurality of acoustic transducers and a signal processor. The plurality of acoustic transducers are arranged on one surface of the plate-like member to surround at least a portion of an outer perimeter of a measuring area of the plate-like member to transmit and receive ultrasonic guided waves. The signal processor recognizes a target object touching a surface of the measuring area through ultrasonic wave tomography that applies a time-reversal process with respect to a signal transmitted from at least one of the plurality of acoustic transducers and a signal received by at least one of the remaining acoustic transducers.

19 Claims, 15 Drawing Sheets

(56) References Cited

U.S. PATENT DOCUMENTS

| | | | |
|---|---|---|---|
| 2015/0241393 A1* | 8/2015 | Ganti | G01N 29/09 |
| | | | 73/589 |
| 2015/0245822 A1* | 9/2015 | Kim | A61B 8/546 |
| | | | 600/472 |
| 2017/0053151 A1* | 2/2017 | Yeke Yazandoost | |
| | | | A61B 5/6898 |
| 2018/0032211 A1 | 2/2018 | King et al. | |
| 2020/0134279 A1* | 4/2020 | Hansen | G06K 9/209 |

OTHER PUBLICATIONS

Lu, "Piezoelectric Micromachined Ultrasonic Transducers for Fingerprint Sensing", May 2015, 162 pages total.

Draeger et al., "One-Channel Time Reversal of Elastic Waves in a Chaotic 2D-Silicon Cavity", Physical Review Letters, vol. 79, No. 3, Jul. 21, 1997, pp. 407-410, 4 pages total.

Liu et al., "Baseline-free delamination inspection in composite plates by synthesizing non-contact air-coupled Lamb wave scan method and virtual time reversal algorithm", Smart Materials and Structures, vol. 24, 2015, pp. 1-15, 16 pages total.

* cited by examiner

FINGERPRINT SENSOR OF ELECTRONIC DEVICE

CROSS-REFERENCE TO RELATED APPLICATION

This application is based on and claims the benefit of Korean Patent Application No. 10-2018-0158380, filed on Dec. 10, 2018, in the Korean Intellectual Property Office, the disclosure of which is incorporated herein in its entirety by reference.

BACKGROUND

1. Field

The present disclosure relates to a fingerprint sensor of an electronic device.

2. Description of the Related Art

The need for personal authentication using unique personal characteristics like a fingerprint, a voice, a face, a hand, or an iris is increasing. Personal authentication functions are widely used in financial devices, access control devices, mobile devices, notebook computers, etc. Recently, as mobile devices like smartphones and tablet PCs have been popularized, a fingerprint sensor (a fingerprint recognition sensor) for personal authentication has been employed to protect a large amount of security information stored in the smartphones or the tablet PCs.

Fingerprint recognition techniques for smartphones and tablet PCs in the related art are implemented by fingerprint sensors configured separately from touch screens. Recently, a technique for performing both fingerprint recognition and touch sensing on the same display panel has been proposed.

SUMMARY

The disclosure relates to a fingerprint sensor of an electronic device using ultrasonic guided waves.

The disclosure relates to a fingerprint sensor of an electronic device capable of recognizing a fingerprint within a large area.

Additional aspects will be set forth in part in the description which follows and, in part, will be apparent from the description, or may be learned by practice of the presented embodiments.

In accordance with an aspect of the disclosure, an electronic device includes a plurality of acoustic transducers arranged on one surface of a plate-like member, the plurality of acoustic transducers surrounding at least a portion of an outer perimeter of a measuring area of the plate-like member, the plurality of acoustic transducers being configured to transmit and receive ultrasonic guided waves; and a signal processor configured to recognize a target object touching a surface of the measuring area of the plate-like member through ultrasonic wave tomography by applying a time-reversal process with respect to a signal transmitted from at least a first acoustic transducer from among the plurality of acoustic transducers and a signal received by at least a second acoustic transducer from among the plurality of acoustic transducers.

The signal processor may be further configured to recognize a touch location or a fingerprint of a finger by recognizing a target object contacting the surface of the plate-like member.

The plate-like member may include first to fourth outer portions surrounding the measuring area, the first to fourth outer portions corresponding to first to fourth sides of the measuring area, and the plurality of acoustic transducers may be arranged on at least two from among the first to fourth outer portions.

The electronic device may further include a display, wherein the plate-like member corresponds to a front cover of the display or a back cover of the electronic device, and wherein the plurality of acoustic transducers are arranged inside the plate-like member.

The electronic device may further include a matching layer configured to match an acoustic impedance between the plate-like member and the plurality of acoustic transducers.

The electronic device may further include a sound absorbing layer configured to absorb ultrasonic waves traveling between the plurality of acoustic transducers and a frame of the electronic device.

The electronic device may further include a display, wherein a front cover of the display comprises the plate-like member, wherein the plurality of acoustic transducers are arranged inside the plate-like member, and wherein a size of the measuring area is equal to or larger than a size of the display, and the plurality of acoustic transducers are located at an outer perimeter of the display.

The plate-like member may include at least one from among glass, metal, and plastic.

The plurality of acoustic transducers may include any one from among a piezoelectric wafer active sensor (PWAS), an electromagnetic acoustic transducer (EMAT), a magnetostrictive patch transducer (MPT), and a surface-acoustic-wave (SAW) sensor.

The ultrasonic guided wave may include one from among a Lamb wave in a symmetric mode, a Lamb wave in an asymmetric mode, a shear-horizontal wave, and a surface wave.

The target object may include a finger, and each acoustic transducer from among the plurality of acoustic transducers may be configured to transmit and receive an ultrasonic wave having a wavelength smaller than a size of a touch region of the finger and a width of a ridge of a fingerprint of the finger.

The electronic device may further include a controller configured to control transmission and reception of the ultrasonic guided waves of the plurality of acoustic transducers, and in response to the controller inputting an input signal to the first acoustic transducer, the first acoustic transducer may be configured to transmit an ultrasonic guided wave, the second acoustic transducer may be configured to receive the ultrasonic guided wave, and then the second acoustic transducer may be configured to transmit a reversal ultrasonic guided wave having a time-reversed signal obtained by time-reversing the ultrasonic guided wave received by the second acoustic transducer, and then the first acoustic transducer may be configured to receive the reversal ultrasonic guided wave and to obtain a reconstructed signal based on the received reversal ultrasonic guided wave.

The signal processor may be further configured to obtain a touch location or a fingerprint image by a delay-sum method of a residual signal, the residual signal being a difference between the input signal input to the first acoustic transducer and the obtained reconstructed signal.

The signal processor may be further configured to obtain a touch location or a fingerprint image by a probabilistic method from a difference between the input signal input to the first acoustic transducer and the obtained reconstructed signal.

The probabilistic method may include a reconstruction algorithm for probabilistic inspection of damage (RAPID).

The electronic device may further include a controller configured to control transmission and reception of the ultrasonic guided waves of the plurality of acoustic transducers, wherein, in response to the controller inputting an input signal to the first acoustic transducer, the first acoustic transducer is configured to transmit an ultrasonic guided wave and the second acoustic transducer is configured to receive the ultrasonic guided wave, and wherein, in response to the second acoustic transducer receiving the ultrasonic guided wave, the signal processor is further configured to calculate a wave transfer function from a signal corresponding to the transmitted ultrasonic guided wave and a signal corresponding to the received ultrasonic guided wave, to calculate a time reversed signal based on the calculated wave transfer function, and to obtain a reconstructed signal using the calculated time reversed signal.

The signal processor may be further configured to obtain a touch location or a fingerprint image by a delay-sum method of a residual signal, the residual signal being a difference between the input signal input to the first acoustic transducer and the obtained reconstructed signal.

The signal processor may be further configured to obtain a touch location or a fingerprint image by a probabilistic method from a difference between the input signal input to the first acoustic transducer and the obtained reconstructed signal.

The probabilistic method may include a reconstruction algorithm for probabilistic inspection of damage (RAPID).

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figure 1:
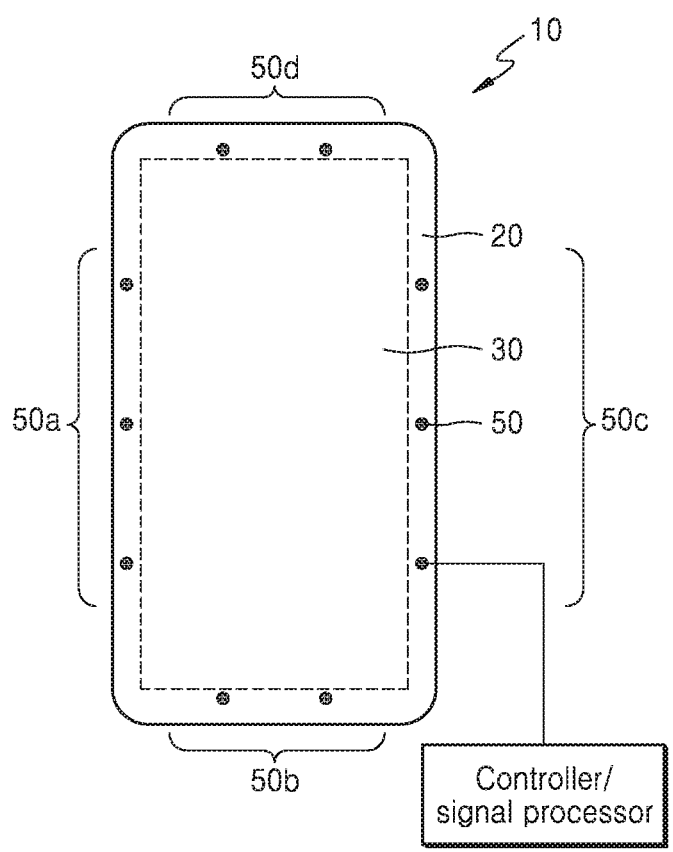
FIG. 1 is a diagram schematically showing a fingerprint sensor of an electronic device using an ultrasonic wave according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, the embodiments are merely described below, by referring to the figures, to explain aspects of the disclosure. As used herein, the term "and/or" includes any and all combinations of one or more of the associated listed items. Expressions such as "at least one of" and "at least one from among", when preceding a list of elements, modify the entire list of elements and do not modify the individual elements of the list.

Hereinafter, example embodiments will be described in detail with reference to the accompanying drawings. In the drawings, like reference numerals denote like elements, and the size of each element in the drawings may be exaggerated for clarity and convenience of explanation. The embodiments described below are merely illustrative, and various modifications are possible from these embodiments.

It will be understood that when an element or layer is referred to as being "on" another element or layer, the element or layer can be directly on the other element or layer or intervening elements or layers may be present. An expression used in the singular encompasses the expression of the plural, unless it has a clearly different meaning in the context. In addition, unless explicitly described to the contrary, the word "comprise" or "include" will be understood to imply the inclusion of stated elements but not the exclusion of any other elements. The use of the terms "a" and "an" and "the" and similar referents (especially in the context of the following claims) are to be construed to cover both the singular and the plural.

FIG. 1 is a diagram schematically showing a fingerprint sensor (a fingerprint recognition sensor) of an electronic device 10 using an ultrasonic wave according to an embodiment.

Referring to FIG. 1, the electronic device 10 includes a plurality of acoustic transducers 50 that are arranged to at least partially surround the outer perimeter of a plate-like member 20 including a measuring area 30 and configured to transmit and receive ultrasonic guided waves, and a signal processor configured to process a signal to recognize a target object contacting a surface of the plate-like member 20. The electronic device 10 may further include a controller configured to control transmission and reception of ultrasonic guided waves of the plurality of acoustic transducers 50. Although FIG. 1 shows a case where a front surface of the plate-like member 20 excluding the outer perimeter of the plate-like member 20 constitutes the measuring area 30, the plurality of acoustic transducers 50 may be arranged to use only a portion of the plate-like member 20 as the measuring area 30. In other words, since the measuring area 30 corresponds to an area inside the plurality of acoustic transducers 50 arranged to surround a certain area, the plurality of acoustic transducers 50 may be arranged such that only a portion of the plate-like member 20 of the electronic device 10 corresponds to the measuring area 30. For example, the plurality of acoustic transducers 50 may be arranged so as to surround a lower half of the plate-like member 20 without surrounding an upper half of the plate-like member 20. As described below in detail, the fingerprint sensor according to an embodiment is capable of recognizing a touch position or a fingerprint pattern of a finger by recognizing a target object contacting a surface of the plate-like member 20 within the measuring area 30 by applying an ultrasonic tomography technique, that is, a time reversal technique or a virtual time reversal technique.

The plate-like member 20 may include at least one of glass, metal, and plastic, for example. In addition, the plate-like member 20 constitutes an outer surface of an electronic device used as a fingerprint sensor and may include various materials. The plate-like member 20 may include first to fourth outer portions surrounding the measuring area 30 in which a touch position or a fingerprint of a finger is recognized, and the plurality of acoustic transducers 50 may be arranged on at least two of the first to fourth outer portions. In FIG. 1 and the below embodiments, a case where the plurality of acoustic transducers 50 are arranged in all of the first to fourth outer portions will be described as an example. For example, the electronic device 10 may include a first acoustic transducer array 50a arranged in the first outer portion, a second acoustic transducer array 50b arranged in the second outer portion, a third acoustic transducer array 50c arranged in the third outer portion, and a fourth acoustic transducer array 50d arranged in the fourth outer portion.

Meanwhile, the electronic device 10 may further include a display. In this case, the plate-like member 20 may correspond to a front cover of the display or a back cover of the electronic device 10. The plate-like member 20 may be a cover located at the front or the rear of the electronic device 10. The plurality of acoustic transducers 50 may be arranged at an inner side of the plate-like member 20 to surround the outer perimeter of the measuring area 30 and so as not to be exposed on an external surface of the electronic device 10. As described above, the fingerprint sensor according to an embodiment may be provided at the front or the rear of the electronic device 10.

Considering that the plate-like member 20 includes the measuring area 30 in which a touch position or a fingerprint of a finger is recognized and the first to fourth outer portions that surround the outer perimeter of the measuring area 30 to arrange the plurality of acoustic transducers 50 thereon, the measuring area 30 functioning as a fingerprint sensor area may correspond to the entire display area shown at the front of the electronic device 10, a portion of the display area, the entire rear surface of the electronic device 10, or a portion of the rear surface of the electronic device 10.

In an embodiment, an ultrasonic guided wave may be any one of a Lamb wave in a low-order symmetric mode or an asymmetric mode ($S_0$ mode or $A_0$ mode), a shear horizontal wave ($SH_0$ mode), and a surface wave. To this end, acoustic transducers for generating Lamb waves in a low-order mode, shear horizontal waves, and surface waves may be selected as the plurality of acoustic transducers 50. Also, acoustic transducers capable of transmitting and receiving ultrasonic guided waves having a smaller wavelength than the size of a finger touch area and a ridge width of a fingerprint may be selected as the plurality of acoustic transducers 50. In other words, when the target object is a finger of a user, the acoustic transducers may be capable of transmitting and receiving ultrasonic guided waves having a smaller wavelength than the size of a touch area of the finger and a ridge width of a fingerprint of the finger.

For example, the plurality of acoustic transducers 50 may include any one of a piezoelectric wafer active sensor (PWAS), an electromagnetic acoustic transducer (EMAT), a magnetostrictive patch transducer (MPT), and a surface-acoustic-wave (SAW) sensor. Also, the acoustic transducer 50 may be implemented with various types of acoustic transducers capable of transmitting and receiving ultrasonic guided waves.

Hereinafter, configurations and operations of a fingerprint sensor according to embodiments will be described based on a case where the electronic device 10 includes a display and the plate-like member 20 including the measuring area 30 serving as a fingerprint sensor area is a display front cover. The configurations and the operations of the fingerprint sensor may also be applied when the plate-like member 20 including the measuring area 30 serving as the fingerprint sensor area is a back cover of the electronic device 10. Alternatively, although the below descriptions exemplify a case where the measuring area 30 serving as a fingerprint sensor area corresponds to an entire display surface, only a portion of the display surface may be used as the measuring area 30 serving as a fingerprint sensor area.

Figure 2:
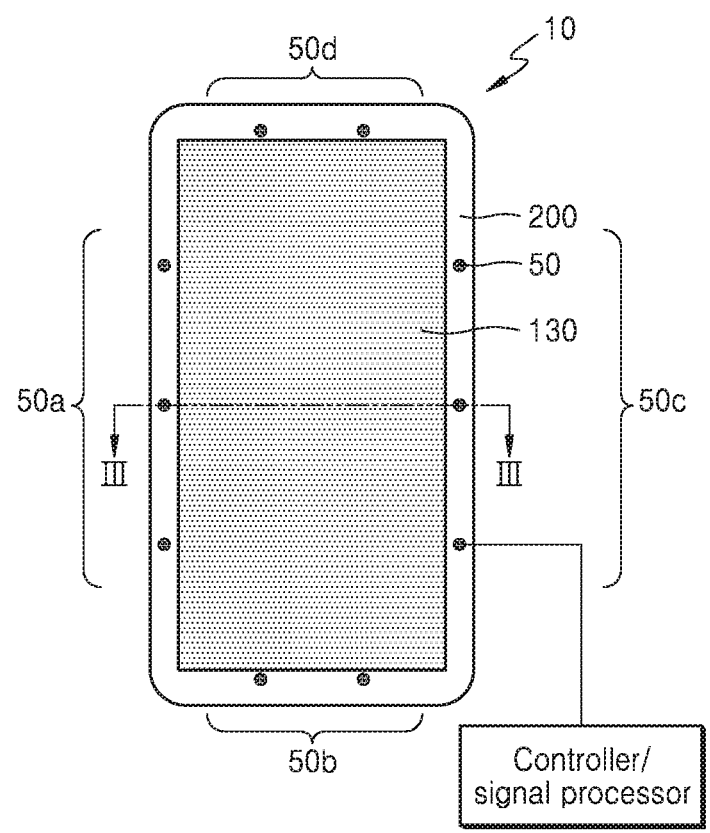
FIG. 2 is a diagram schematically showing a fingerprint sensor of the electronic device using an ultrasonic guided wave according to an embodiment.
Figure 3:
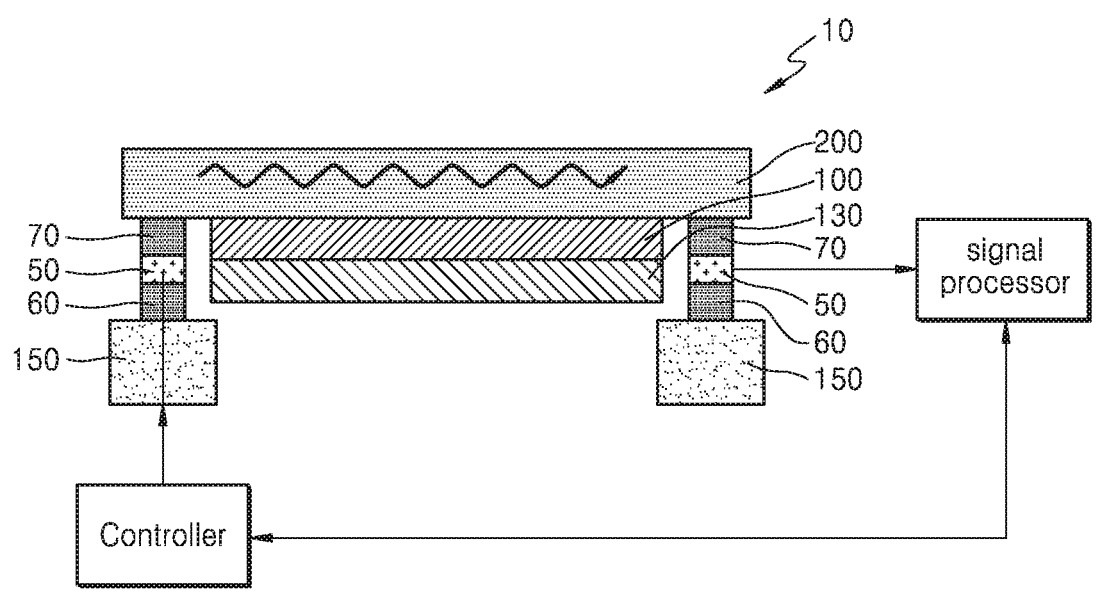
FIG. 3 is a schematic cross-sectional view of a fingerprint sensor of the electronic device using an ultrasonic guided wave according to an embodiment.

FIG. 2 is a diagram schematically showing a fingerprint sensor of the electronic device 10 using an ultrasonic guided wave according to an embodiment. FIG. 3 is a cross-sectional view of a fingerprint sensor of the electronic device 10 using an ultrasonic guided wave according to an embodiment, taken along a line III-III of FIG. 2.

Referring to FIGS. 2 and 3, the electronic device 10 includes a display 130, and a plate-like member including a measuring area serving as a fingerprint sensor area may be a front cover 200 of the display 130. In this case, the measuring area 30 of FIG. 1 may correspond to the front cover 200 located on the display 130. In other words, the front cover 200 may be provided to have a width wider than the display 130 in at least one direction to completely cover the display 130. FIG. 2 shows a case where the front cover 200 is provided to completely cover the display 130, the first to fourth outer portions are arranged around the display 130, and the acoustic transducers 50 are arranged in the first to fourth outer portions. The acoustic transducers 50 may be provided inside the front cover 200 to surround the display 130 and so as not to be exposed to an external surface. An adhesive layer 100 may be provided between the display 130 and the front cover 200.

A matching layer 70 for matching acoustic impedances may further be provided between the front cover 200 and the acoustic transducers 50. Also, a sound-absorbing layer 60 may be further provided between the acoustic transducers 50 and a frame 150 to absorb rear ultrasonic waves.

As shown in FIGS. 2 and 3, when the measuring area corresponds to a surface of the front cover 200 located on the display 130, the measuring area may have a width equal to or greater than that of the display 130 in at least one direction, and the plurality of acoustic transducers 50 may be arranged inside the first to fourth outer portions of the front cover 200 to be located around the outer perimeter of the display 130.

FIG. 3 shows an example in which the acoustic transducer 50 located on the left side transmits ultrasonic guided waves under the control of the controller, the acoustic transducer 50 located on the right side receives the transmitted ultrasonic guided waves, and signals corresponding to the received ultrasonic guided waves are input to a signal processor. The acoustic transducer 50 on the left side may also receive transmitted ultrasonic guided waves and the acoustic transducer 50 on the right may also transmit ultrasonic guided waves. Therefore, both the acoustic transducers 50 may be electrically connected to the controller and the signal processor. Also, FIG. 3 shows the two acoustic transducers 50. Since each of the plurality of acoustic transducers 50 may transmit and receive ultrasonic waves, all of the plurality of acoustic transducers 50 may be electrically connected to the controller and the signal processor.

Meanwhile, referring to FIGS. 1 to 3, according to the fingerprint sensor according to an embodiment, the signal processor may recognize a touch position or a fingerprint of a finger by recognizing a target object contacting a surface of the plate-like member 20, e.g., the front cover 200 on the display 130, through an ultrasonic guided wave tomography obtained by applying a time reversal technique or a virtual time reversal technique with respect to a signal transmitted from at least one of the plurality of acoustic transducers 50 and signals received from the others of the plurality of acoustic transducers 50.

For example, from among the plurality of acoustic transducers 50, an acoustic transducer that transmits ultrasonic guided waves according to an input signal input from a controller will be referred to as a first acoustic transducer, and an acoustic transducer that receives ultrasonic guided waves transmitted from the first acoustic transducer will be referred to as a second acoustic transducer.

In this case, after the first acoustic transducer transmits an ultrasonic guided wave and the second acoustic transducer receives the ultrasonic guided wave, a time reversal signal obtained by time-reversing a signal corresponding to the received ultrasonic guided wave may be transmitted by the second acoustic transducer, and the first acoustic transducer may receive an ultrasonic guided wave (i.e., a reversal ultrasonic guided wave) of the transmitted time reversal signal and obtain a reconstructed signal therefrom. Alternatively, after the first acoustic transducer transmits an ultrasonic guided wave and the second acoustic transducer receives the ultrasonic guided wave, a wave transfer function may be calculated from a signal corresponding to the transmitted ultrasonic guided wave and a signal corresponding to the received ultrasonic guided wave and obtain a reconstructed signal through a virtual time reversal process.

After obtaining a reconstructed signal as described above, a touch position or a fingerprint image may be obtained by delay-and-sum of residual signals corresponding to a difference between an input signal applied to the first acoustic transducer and the reconstructed signal. A delay-and-sum method will be later described in more detail with reference to FIG. 9.

Figure 4:
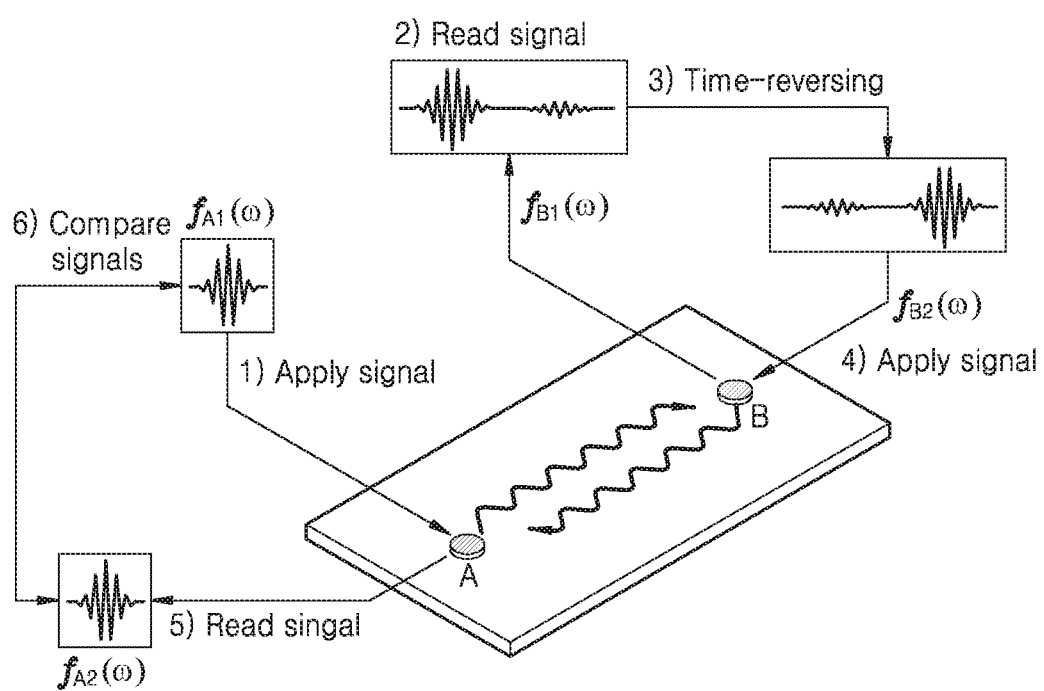
FIG. 4 is a diagram showing an example of a time reversal process.

FIG. 4 is a diagram showing an example of a time reversal process.

Referring to FIG. 4, the time reversal process includes a forward process and a backward process. The forward process is a process in which a signal $f_{A1}$ transmitted from one acoustic transducer A is transmitted to another acoustic transducer B to receive a signal $f_{B1}$. The backward process is a process in which the acoustic transducer B at a reception point transmits a signal $f_{B2}$ obtained by time-reversing the signal $f_B$, the signal $f_{B2}$ is transmitted to the acoustic transducer A at the initial transmission point, and a signal $f_{A2}$ is received. At this time, the received signal $f_{A2}$ has the same waveform as that of the initially transmitted signal $f_{A1}$, wherein the magnitude of the signal $f_{A2}$ is different from that of the initially transmitted signal $f_{A1}$. This is called time reversibility. When there is damage to a path, the shape of a signal restored during a time reversal process is different from that of an original input signal, and it may be determined whether there is damage to the path by using the time reversal process.

Figure 9:
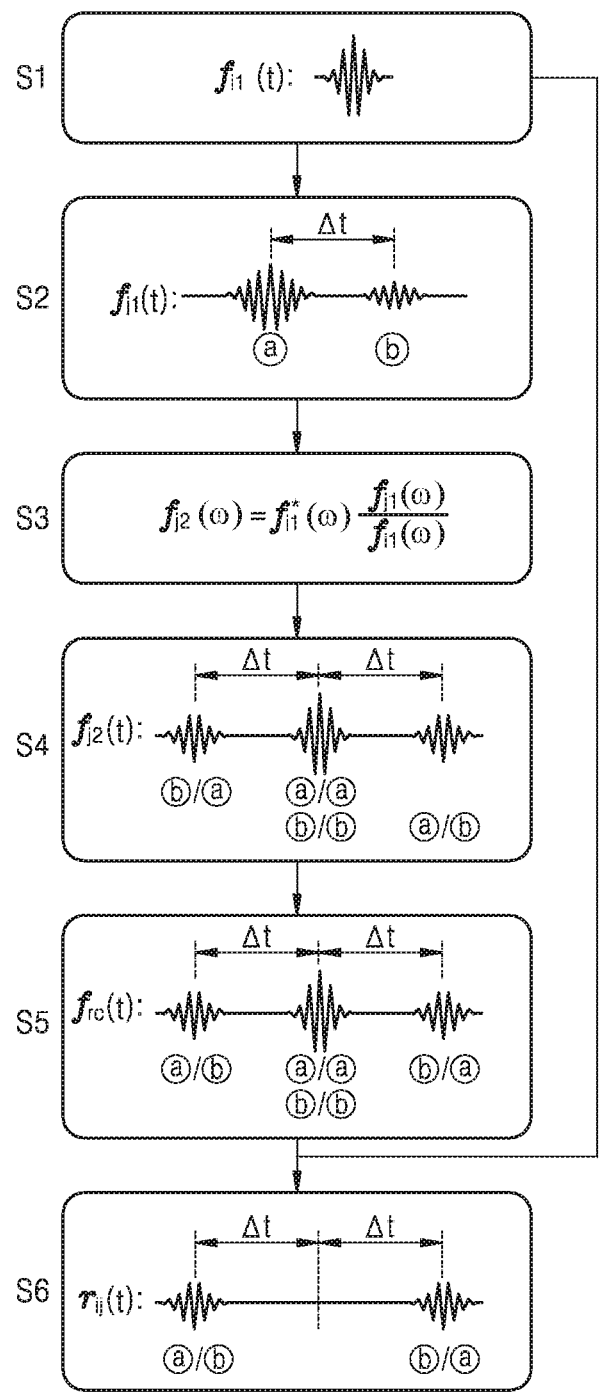
FIG. 9 is a diagram showing examples of signal waveforms in operations of a process for obtaining a reconstructed signal through a time-reversal process with acoustic transducers at the point i and the point j.

In the case of using the time reversal process shown in FIG. 4, a backward process is performed for time-reversing signals received from respective receiving acoustic transducers (e.g., acoustic transducer B of FIG. 4), applying time-reversed signals to the respective receiving acoustic transducers, and receiving a signal transmitted to an initially transmitted acoustic transducer (e.g., acoustic transducer A of FIG. 4). Residual signals obtained by subtracting an initially input waveform from a reconstructed signal obtained through a time reversal process as shown in FIG. 9 described below include waveforms reflected and transmitted from a touch or fingerprint ridge boundaries. From all of the obtained residual signals, a touch or a fingerprint in the measuring area may be imaged by using a delay-and-sum method.

In the time reversal process of FIG. 4, a backward process in which signals received from the respective acoustic transducers during the forward process are time-reversed, stored, and transmitted in the reverse direction is needed.

Figure 5:
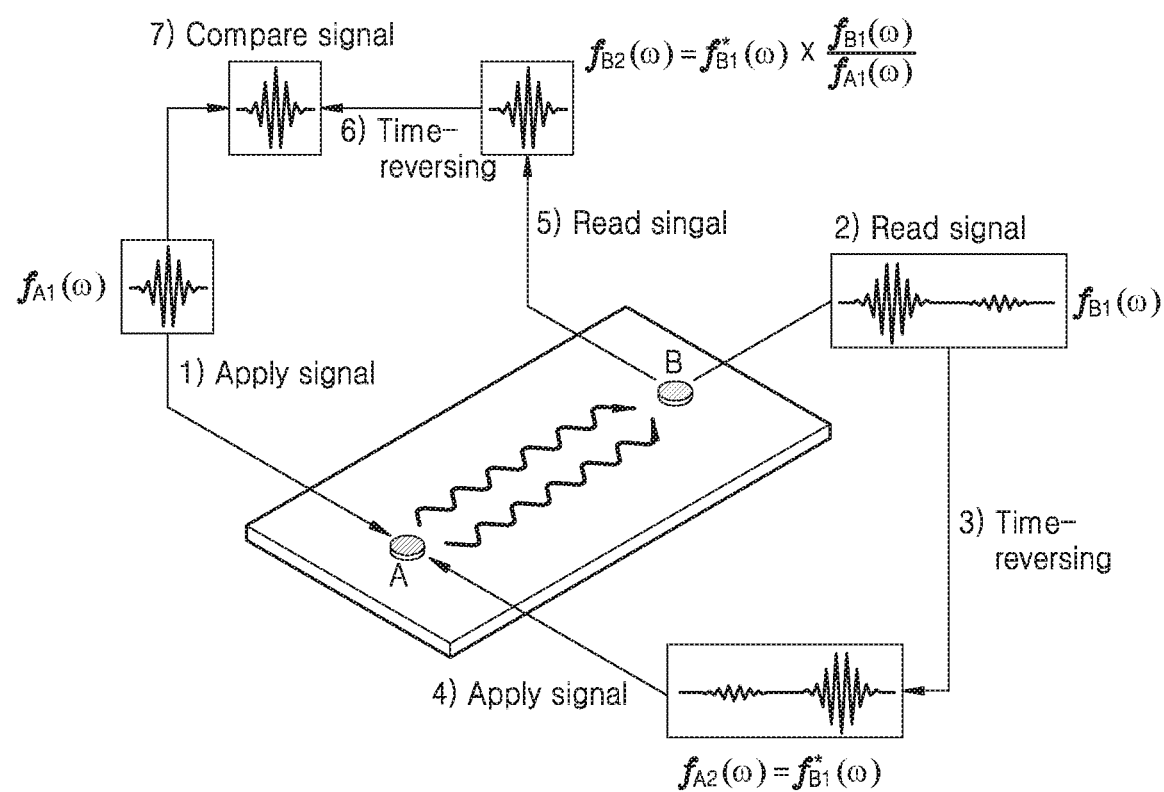
FIG. 5 is a diagram showing an example of a virtual time reversal process.

On the other hand, in the case of using a virtual time reversal process as shown in FIG. 5, a reconstructed signal through the backward process may be obtained through a calculation. Even in the case of using a virtual time-reversal technique as shown in FIG. 5, a touch or a fingerprint in the measuring area may be imaged by using a delay-and-sum method from all of the obtained residual signals.

FIG. 5 is a diagram showing an example of a virtual time reversal process.

Referring to FIG. 5, when a virtual time reversal process is used, a reconstructed signal obtained through a backward process is obtained through a calculation instead of directly using an acoustic transducer. During the virtual time reversal process, a measurement may be simplified by numerically calculating the backward process. A ratio of the frequency components of the signal $f_A$, transmitted from one acoustic transducer A (i.e., a first acoustic transducer) to another acoustic transducer B (i.e., a second acoustic transducer) and the signal $f_{B1}$ received by the another acoustic transducer B indicates a wave transfer function of a path A-B $G(r,\omega)$ and may be calculated as shown in Equation 1.

$$G(r, \omega) = \frac{f_{B1}(\omega)}{f_{A1}(\omega)} \quad \text{[Equation 1]}$$

On the other hand, the time reversal of a signal in the time domain is equivalent to taking a complex conjugate of the signal in the frequency domain. Therefore, a virtual backward received signal $f_{B2}(\omega)$ (i.e., a virtual reversal of the signal $f_{B1}$ received by the another acoustic transducer B) may be calculated as shown in Equation 2 below.

$$f_{B2}(\omega)=f_{A2}(o)G(r,\omega)=f^*{}_{B1}(\omega)G(r,\omega)=(f_{A1}(\omega)$$
$$G(r,\omega))^*G(r,\omega)=f^*{}_{A1}(\omega)G^*(r,\omega)G(r,\omega) \quad \text{[Equation 2]}$$

In the frequency domain, since the virtual backward received signal $f_{B2}(\omega)$ is a function of the complex conjugate $f^*{}_{A1}(\omega)$ of the initially transmitted signal $f_{A1}$, a final reconstructed signal $f_{rc}(\omega)$ may be calculated by time-reversing the virtual backward received signal $f_{B2}(\omega)$. Assuming that there is no significant change in $G_{tr}(\omega)=G^*(r,\omega)G(r,\omega)$ depending on the frequency, the final reconstructed signal $f_{rc}(\omega)$ has the same waveform as the initially transmitted signal $f_{A1}$ even when the waveform is a dispersed waveform, although the magnitudes of signals differ.

Therefore, even when an input signal varies due to the variation of operating conditions, a reconstructed signal that is the same as a current input signal may be obtained, and thus a signal comparison insensitive to waveform changes due to dispersion and operating condition changes may be performed. When there is damage to a path, the shape of a reconstructed signal during a time reversal process is different from that of an original input signal, and it may therefore be determined whether there is damage to the path by using the time reversal process. Even in the case of using a virtual time-reversal technique as shown in FIG. 5, a touch or a fingerprint in the measuring area may be imaged by using a delay-and-sum method from all of the obtained residual signals.

Figure 6A:
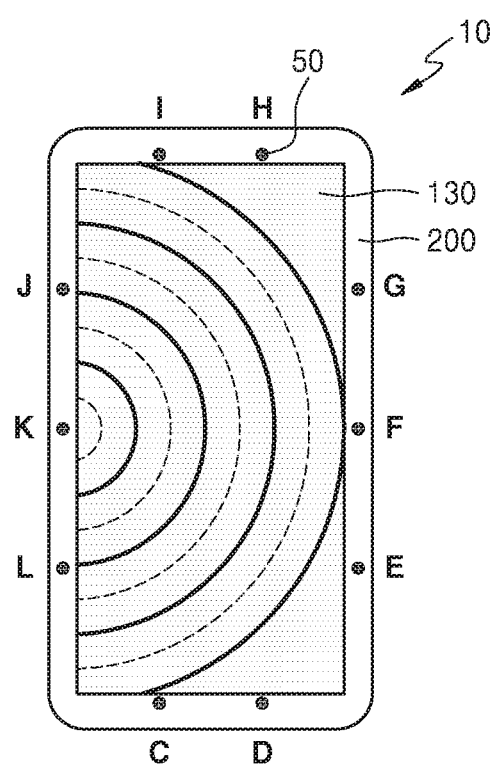
FIGS. 6A and 6B are diagrams for describing processes for transmission and reception of ultrasonic waves according to a tomography technique.
Figure 6B:
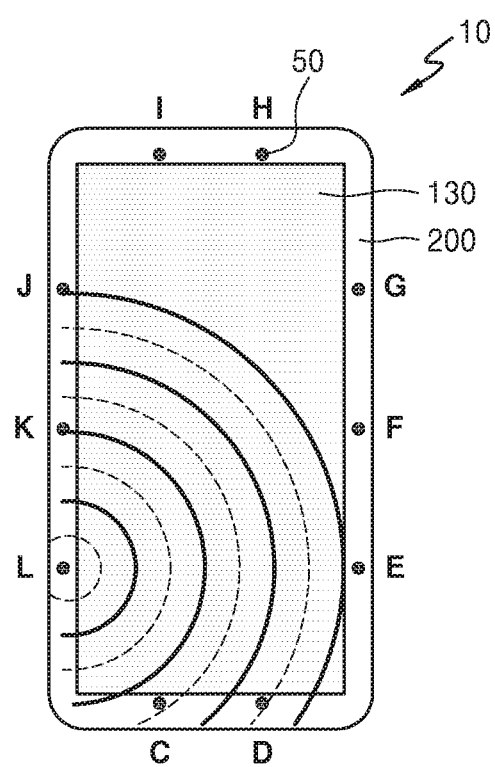

FIGS. 6A and 6B are diagrams for describing processes for transmission and reception of ultrasonic waves according to a tomography technique. The acoustic transducers 50 may generate ultrasonic guided waves propagating within a plate-like member in all directions, e.g., Lamb waves or shear horizontal waves. The acoustic transducers 50 may receive ultrasonic guided waves propagating in all directions, e.g., Lamb waves or shear horizontal waves. In other words, a Lamb wave or a shear horizontal wave propagating from one acoustic transducer 50 may be propagated to and received by all of the remaining acoustic transducers 50. For example, in a case where ten acoustic transducers K, L, C, D, E, F, G, H, I, and J are arranged inside the front cover 200 around the outer perimeter of the display 130, an ultrasonic guided wave is initially generated by an acoustic transducer K, and the ultrasonic guided wave is received by the other acoustic transducers L, C, D, E, F, G, H, I, and J. Next, an ultrasonic guided wave is generated by an acoustic transducer L and the ultrasonic guided wave is received by the other acoustic transducers K, C, D, E, F, G, H, I, and J. The above-stated process is sequentially repeated for each of the acoustic transducers. Finally, an ultrasonic guided wave is generated by an acoustic transducer J, and the ultrasonic guided wave is received by the other acoustic transducers K, L, C, D, E, F, G, H, and I.

In the case of using the time reversal process shown in FIG. 5, a backward process is performed for time-reversing signals received from respective acoustic transducers 50, applying time-reversed signals to the respective acoustic transducers 50, and receiving another signal from an initially transmitting acoustic transducer. In the case where ten acoustic transducers 50 are arranged as shown in FIGS. 6A and 6B, a total of 90 ($=_{10}P_2$) pieces of data may be obtained. Since the law of reciprocity is established, it may be also possible to obtain 45 pieces of transmitted/received data ($=_{10}C_2$). (In other words, when an ultrasonic wave is generated by the acoustic transducer K and data received by the acoustic transducer L is obtained, the process in which the acoustic transducer L generates an ultrasonic wave and the acoustic transducer K obtains the received data may be redundant and therefore omitted.)

Figure 7:
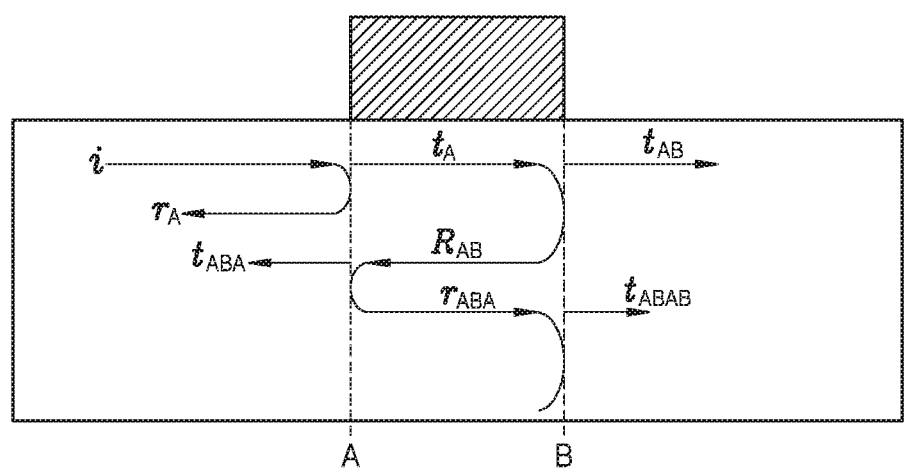
FIG. 7 is a diagram showing that, when there is a touch on a path, a transmission-reflection occurs due to an acoustic impedance difference between touch boundaries A and B.

FIG. 7 is a diagram showing that, when there is a touch on a path, a transmission-reflection occurs due to an acoustic impedance difference between touch boundaries A and B. The position of a touch may be determined by using a reflected wave and a transmitted wave. When an incident wave i enters the touch boundary A, a transmitted wave $t_A$ and a reflected wave $r_A$ may occur. When the transmitted wave $t_A$ reaches the touch boundary B, a transmitted wave $t_{AB}$ and a reflected wave $R_{AB}$ may occur. Similarly, when the reflected wave $R_{AB}$ reaches the touch boundary A again, a transmitted wave $t_{ABA}$ and a reflected wave $r_{ABA}$ may occur.

Figure 8:
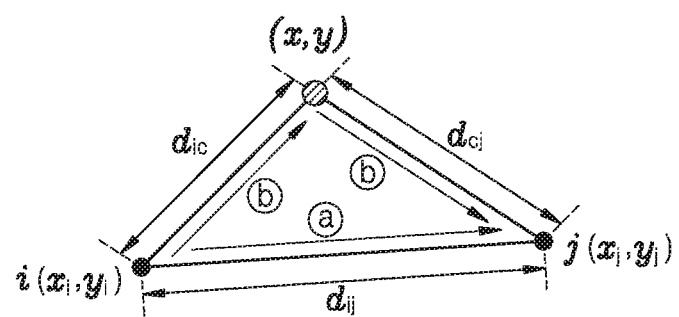
FIG. 8 is a diagram showing a propagation path of an ultrasonic guided wave when the ultrasonic guided wave is transmitted from a point i to a point j in the event of a single touch.

FIGS. 8 and 9 are diagrams for describing touch detection using a reflective wave $r_A$ at a touch boundary.

FIG. 8 is a diagram showing a propagation path of an ultrasonic guided wave when the ultrasonic guided wave is transmitted from a point i to a point j in the event of a single touch. FIG. 9 shows examples of signal waveforms in operations of a process for obtaining a reconstructed signal through a time-reversal process with acoustic transducers at the point i and the point j. In FIG. 8, it is assumed that the acoustic transducers at the point i and the point j are respectively located at a coordinate $(x_i, y_i)$ and a coordinate $(x_j, y_j)$ and a single touch has occurred at a coordinate $(x, y)$.

In FIGS. 8 and 9, ⓐ indicates a direct path and ⓑ indicates an indirect path. When an ultrasonic guided wave $f_{i1}(t)$ like S1 of FIG. 9 is transmitted from the point i, an ultrasonic wave $f_{j1,a}(t)$ propagating through the direct path reaches the point j first, and then an ultrasonic wave $f_{j1,b}(t)$ propagating through the indirect path reaches the point j. As a result, a signal having the waveform like S2 shown in FIG. 9 is received. At this time, an output signal $f_{j1}(t)$ of the acoustic transducer at the point j is as shown in Equation 3.

$$f_{j1}(t)=f_{j1,a}(t)+f_{j1,b}(t) \quad \text{[Equation 3]}$$

Assuming that a single-mode ultrasonic wave propagates, the group velocity $c_g$ of the ultrasonic wave may be calculated from the arrival time $t_{ij}$ of the ultrasonic wave $f_{j1,a}(t)$ propagated via a direct pathway as shown in Equation 4.

$$c_g = \frac{d_{ij}}{t_{ij}} = \quad \text{[Equation 4]}$$

On the other hand, the arrival time $t_{ij}^{xy}$ of an ultrasonic wave $f_{j1,b}(t)$ scattered at the coordinate $(x, y)$ and arriving at the point j may be calculated by using the group velocity $c_g$ as shown in Equation 5.

$$t_{ij}^{xy} = \frac{d_{ic}+d_{cj}}{c_g} = \frac{\sqrt{(x_c-x_i)^2+(y_c-y_i)^2}+\sqrt{(x_j-x_c)^2+(y_j-y_c)^2}}{c_g} \quad \text{[Equation 5]}$$

The subscript c denotes the movement of an ultrasonic wave in an indirect path via the coordinate $(x, y)$. A single touch may be at the circumference of an ellipse where the point i and point j become focal points and the length of the long axis is $d_{ij}^{xy}$ ($=c_g t_{ij}^{xy}$).

Also, a transfer function $G_{ij}(r,\omega)$ of an ultrasonic wave propagated from the point i to the point j may be calculated as shown in Equation 6.

$$G_{ij}(r,\omega) = \frac{f_{j1}(\omega)}{f_{i1}(\omega)} = \frac{f_{j1,a}(\omega) + f_{j1,b}(\omega)}{f_{i1}(\omega)} \quad \text{[Equation 6]}$$

Here, r denotes a moving distance and w denotes an angular frequency.

S3 in FIG. 9 denotes a backward process. The time reversal process as described above with reference to FIG. 4 is a process for transmitting and receiving time reversal signals of S2 in FIG. 9 from a point B to a point A. The virtual time reversal process as described above with reference to FIG. 5 is a process for calculating a reconstructed signal through an equation. In the backward process, a signal $f_{i2}(t)$ input to an acoustic transducer at the point i is a signal obtained by time-reversing a signal $f_{j1}(t)$ based on a time point $T_{tr}$ ($T_{tr}>0$) including a scattering signal $f_{j1,b}(t)$, that is, $f_{i2}(t)=f_{j1}(T_{tr}-t)$. In other words, $f_{i2}(t)$ is a time reversal of $f_{j1}(t)$ with respect to time $T_{tr}$. Time reversal of a signal in the time domain is equivalent to taking a complex conjugate of the signal in the frequency domain. In other words, $f_{i2}(\omega)=f^*_{j1}(\omega)$. Therefore, in a virtual backward process, a frequency domain signal $f_{j2}(\omega)$ received as an ultrasonic guided wave generated according to an input signal $f_{i2}(t)$ propagates from the point i to the point j may be calculated as shown Equation 7 below.

$$f_{j2}(\omega) = f^*_{i1}(\omega) G^*_{ij}(r,\omega) G_{ij}(r,\omega) \quad \text{[Equation 7]}$$

Next, a time domain reception signal $f_{j2}(t)$ may be calculated by performing a Fourier inverse transform as shown in Equation 8.

$$f_{j2}(t) = \frac{1}{2\pi} \int_{-\infty}^{\infty} f_{j2}(\omega) e^{\hat{i}\omega t} d\omega \quad \text{[Equation 8]}$$

Here, $\hat{i}$ is $\sqrt{-1}$

A reconstructed signal obtained as a result here may be the same as S5 in FIG. 9. In S4 to S6 of FIG. 9, the notation before the slash (/) indicates a propagation path in a forward process, whereas the notation after the slash (/) indicates a propagation path in a backward process. In the case of the backward process as in the case of the forward process, a waveform propagated along a direct path ⓐ arrives first. The received signal shown in S4 of FIG. 9 is a signal received in response to the received signal $d_{j1}(t)$ being time reversed and transmitted. Therefore, in a received signal of the backward process shown in S4 of FIG. 9, a waveform ⓑ/ⓐ is received first and then a waveform ⓐ/ⓐ is received. At the same time as the waveform ⓐ/ⓐ, a waveform ⓑ/ⓑ arrives and finally, a waveform ⓐ/ⓑ is received. A reconstructed signal $f_{rc}(t)$ in S5 of FIG. 9 may be calculated by time-reversing a received signal $f_{j2}(t)$ in the backward process. In a residual signal (S6 of FIG. 9), which is the difference between the reconstructed signal of S5 of FIG. 9 and an excitation signal (reference waveform) of S1 of FIG. 9, only the waveform ⓐ/ⓑ and the waveform ⓑ/ⓐ, which are ultrasonic components scattered and propagated from a coordinate (x, y), remain. Also, as shown in S6 of FIG. 9, the residual signal has the maximum value after a time $\Delta t_{ij}^{xy} = t_{ij}^{xy} - t_{ij}$ from a reference time (t=0) at which the waveform ⓐ/ⓐ reaches its maximum.

Based on the arrival time of the reference waveform, the position of a single touch may be estimated from the difference between the arrival times of the waveforms ⓐ/ⓑ and ⓑ/ⓐ. A single touch is located at the perimeter of an ellipse where the point i and the point j are focal points and the length of a long axis is $d_{ij}^{xy}=c_g t_{ij}^{xy}$. In the same regard, the position of a single touch may be estimated from residual signals of a combination of at least two acoustic transducers 50. An average signal $s_{xy}(t)$ may be calculated by delaying residual signals $r_{ij}(t)$ by a time $-\Delta t_{ij}^{xy}$ and summing the same as shown in Equation 9.

$$s_{xy}(t) = \frac{1}{N_p} \sum_{i=1}^{N-1} \sum_{j=i+1}^{N} [r_{ij}(t + \Delta t_{ij}^{xy}) \cdot w(t)] \quad \text{[Equation 9]}$$

Here, $N_p$ ($=_N C_2 = N(N-1)/2$) (here, N is the total number of acoustic transducers) represents the total number of combinations of acoustic transducers and w(t) is a window function. For example, as shown in Equation 10, w(t) may be a rectangular window function.

$$w(t) = \begin{cases} 1, & \text{if } T_1 < t < T_2 \\ 0, & \text{otherwise} \end{cases} \quad \text{[Equation 10]}$$

Here, when the coordinate (x, y) is an actual contact position, $T_1(<0)$ and $T_2(>0)$ may be defined such that a scattered waveform in the actual contact position may be included and integrated. w(t) may be another type of function. An image pixel value at the coordinate (x, y) may be calculated as shown in Equation 11.

$$P(x,y) = \int_{T_3}^{T_4} [s_{xy}(t;x,y)]^2 dt \quad \text{[Equation 11]}$$

In the same regard, $T_3(<0)$ and $T_4(>0)$ may be defined to include a scattered waveform. As described above, in the case of a pair of acoustic transducers, an elliptical image in which the positions of the pair of acoustic transducers become focal points is appeared and, as pairs of acoustic transducers are additionally accumulated, a contact position is emphasized where the plurality of ellipses intersect. This calculation may be performed at all points in an image grid within the measuring area 30 to construct an image.

Figure 10:
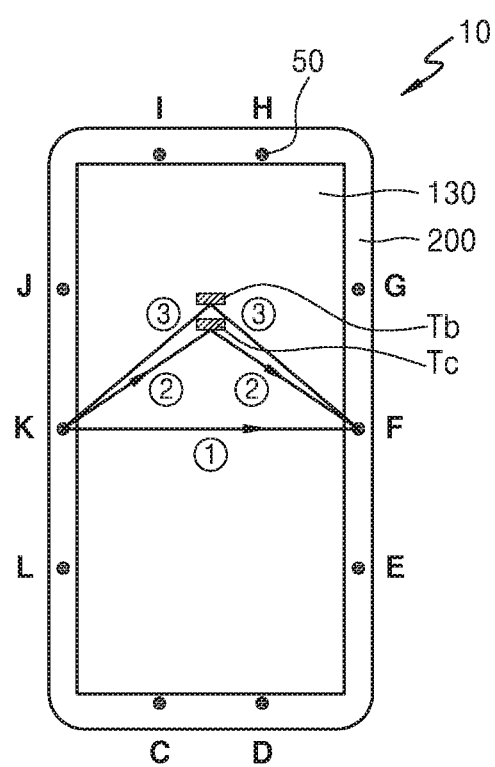
FIG. 10 is a diagram showing the propagation path of ultrasonic waves in the case of transmitting and receiving the ultrasonic waves when there are two contacts.
Figure 11:
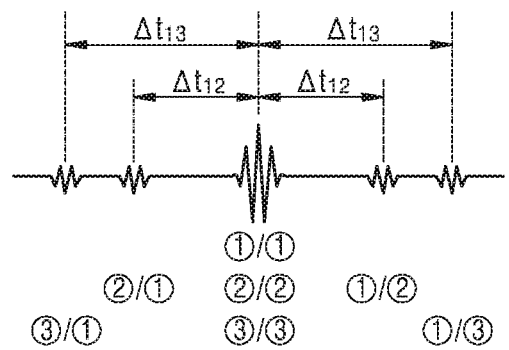
FIG. 11 is a diagram showing signal waveforms in operations in a process of obtaining a reconstructed signal via a time reversal process.

Also, a fingerprint pattern having a plurality of contacts may also be imaged and recognized. For convenience of explanation, only signal components on two contact reflection surfaces are shown in FIGS. 10 and 11. FIG. 10 shows the propagation path of ultrasonic waves in the case of transmitting and receiving the ultrasonic waves from a point K to a point F when there are two contacts. FIG. 11 is a diagram showing signal waveforms in operations in a process for finding a reconstructed signal via a time reversal process with the acoustic transducers 50 at the point K and the point F. FIG. 11 includes diagrams for describing signal components when there are a plurality of contact points.

As shown in FIGS. 10 and 11, reflected waves at two structural discontinuities (i.e., at two different points on the display 130) sequentially appear in received signals according to propagation distances to transmission/reception points. By using the phenomenon, a fingerprint pattern including a plurality of reflection points may also be imaged. From all of the obtained residual signals, a touch or a fingerprint in the measuring area 30 may be imaged by using a delay-and-sum method as shown in Equations 9 to 11.

Figure 12A:
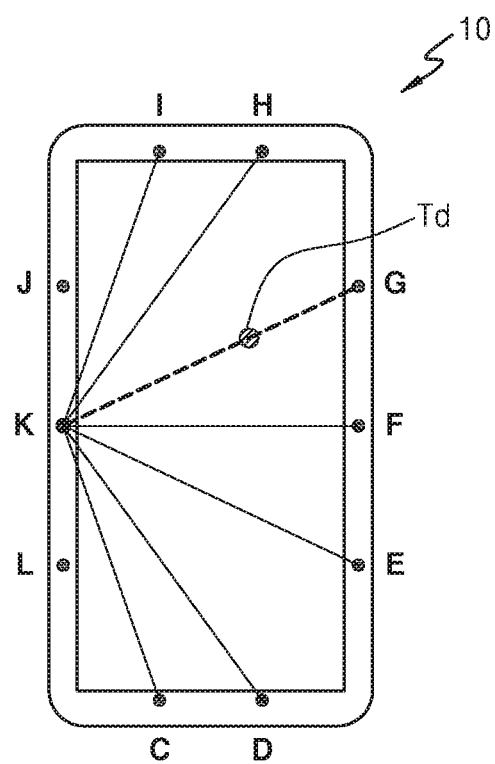
FIGS. 12A and 12B are diagrams for describing a process of transmitting/receiving ultrasonic waves according to a transmission mode tomography method when there is a single touch.
Figure 12B:
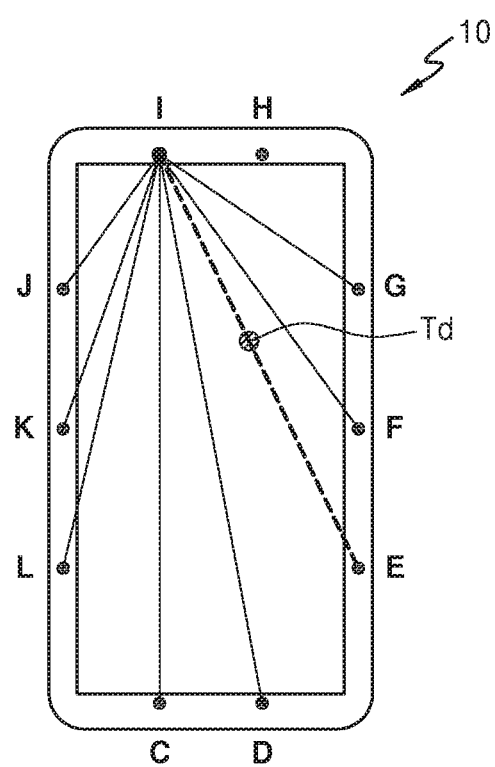

FIGS. 12A and 12B are diagrams for describing a process of transmitting/receiving ultrasonic waves according to a transmission mode tomography method when there is a single touch. In other words, FIGS. 12A and 12B illustrate a touch detection at a touch boundary based on a transmission wave $t_{AB}$ and a reflection-reflection-transmission wave $t_{ABAB}$.

FIG. 12A is a diagram for describing ultrasonic wave propagation when an object Td is touched on a path K-G and an ultrasonic wave is generated by the acoustic transducer 50 at the point K. Ultrasonic waves propagating from the point K propagate to all other points at a uniform velocity except for the point G. Since there is a touch on the path between the point K and the point G, the size and the arrival time of the transmission wave $t_{AB}$ may differ from those of other points. Similarly, the reflection-reflection-transmission wave $t_{ABAB}$ may arrive. Based on the information, it may be determined that there is a touch on the path between the point K and the point G. As shown in FIG. 12B, when the same touch is located on a path E-I, signals received at a point E vary in sizes and arrival times. Therefore, a touch region may be imaged based on abnormal signals on one or more paths.

Figure 13:
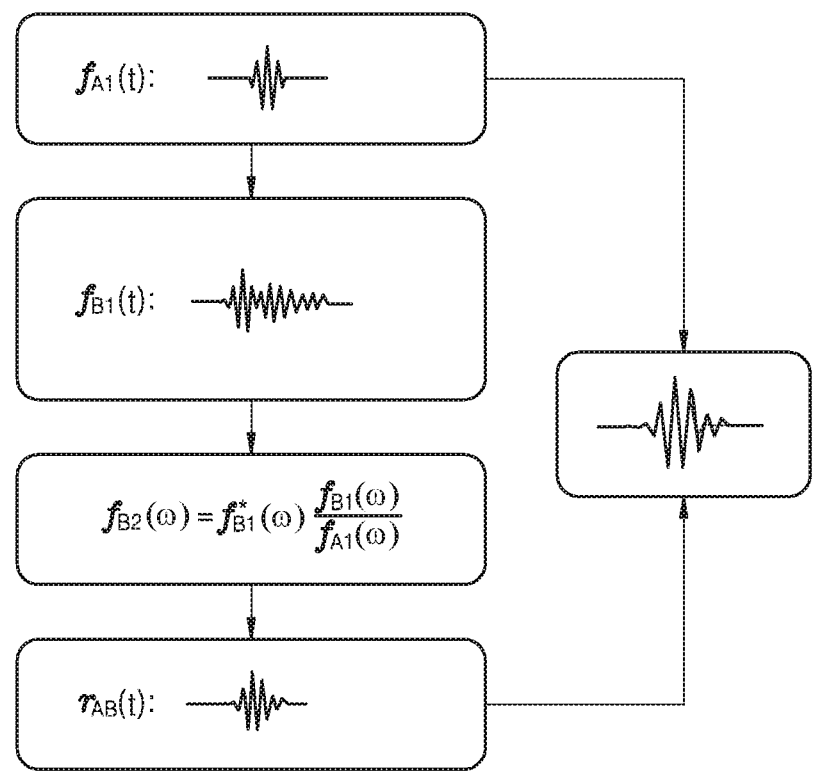
FIG. 13 is a diagram showing signal waveforms in operations of a process of calculating a reconstructed signal through a virtual time-reversal process when each acoustic transducer sequentially transmits ultrasonic waves and remaining acoustic transducers receive the ultrasonic waves during transmission and reception of ultrasonic waves according to the transmission mode tomography method as shown in FIGS. 12A and 12B.

FIG. 13 is a diagram showing signal waveforms in operations of a process for calculating a reconstructed signal through a virtual time-reversal process when each acoustic transducer sequentially transmits ultrasonic waves and remaining acoustic transducers receive the ultrasonic waves during transmission and reception of ultrasonic waves according to the transmission mode tomography method as shown in FIGS. 12A and 12B.

An acoustic transducer may transmit an ultrasonic wave $f_{A1}(t)$, remaining acoustic transducers may receive an ultrasonic wave $f_{B1}(t)$, and a reconstructed signal $r_{AB}(t)$ may be calculated by using the virtual time-reversal method as described above with reference to FIG. 5. Also, it may be determined whether there is a touch on a path based on the difference between a transmission signal and a reconstructed signal. Also, a touch or a fingerprint in the measuring area 30 may be imaged by using a probabilistic method like a reconstruction algorithm for probabilistic inspection of damage (RAPID) from the differences between all of the obtained transmission signals and reconstructed signals.

According to a fingerprint sensor of the electronic device 10 as described above, since an object contacting a surface of a measuring area of a plate-like member is recognized through an ultrasonic guided wave tomography that applies a time-reversal method or a virtual time-reversal method to a signal transmitted by the acoustic transducers 50 and a signal received by the acoustic transducers 50 using ultrasonic guided waves, a touch position or a fingerprint may be recognized within a large area.

The acoustic transducers 50 for transmitting and receiving ultrasonic guided waves may be arranged at a certain interval around a screen boundary of the electronic device 10 including the display 130 and an ultrasonic wave tomography method, i.e., a time-reversal method or a virtual time-reversal method, and may be applied to recognize a touch position or a fingerprint pattern when a finger touch occurs within a screen.

Fingerprint sensor technology according to the above-stated embodiments may implement the electronic device 10, e.g., a smartphone, a tablet PC, a mobile device, etc capable of performing both fingerprint recognition and touch sensing on the panel of the display 130. In addition, the fingerprint sensor technology according to the above-stated embodiments may be applied to various devices demanding recognition of at least one of a touch position and a fingerprint pattern within a large area.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electronic device comprising:
   a plurality of acoustic transducers arranged on one surface of a plate-like member, the plurality of acoustic transducers surrounding at least a portion of an outer perimeter of a measuring area of the plate-like member, the plurality of acoustic transducers being configured to transmit and receive ultrasonic guided waves; and
   a signal processor configured to recognize a target object touching a surface of the measuring area of the plate-like member through ultrasonic wave tomography by obtaining a reconstructed signal through applying a time-reversal process with respect to a signal transmitted from at least a first acoustic transducer from among the plurality of acoustic transducers and a signal received by at least a second acoustic transducer from among the plurality of acoustic transducers; and
   a controller configured to input an input signal to the first acoustic transducer,
   wherein the signal processor is further configured to obtain a residual signal being a difference between the input signal input to the first acoustic transducer and the obtained reconstructed signal, and to obtain a touch location or a fingerprint image based on the residual signal.

2. The electronic device of claim 1, wherein the signal processor is further configured to recognize the touch location or a fingerprint of a finger by recognizing the target object contacting the surface of the plate-like member.

3. The electronic device of claim 1, wherein the plate-like member comprises first to fourth outer portions surrounding the measuring area, the first to fourth outer portions corresponding to first to fourth sides of the measuring area, and
   wherein the plurality of acoustic transducers are arranged on at least two from among the first to fourth outer portions.

4. The electronic device of claim 1, further comprising a display,
   wherein the plate-like member corresponds to a front cover of the display or a back cover of the electronic device, and
   wherein the plurality of acoustic transducers are arranged inside the plate-like member.

5. The electronic device of claim 4, further comprising a matching layer configured to match an acoustic impedance between the plate-like member and the plurality of acoustic transducers.

6. The electronic device of claim 4, further comprising a sound absorbing layer configured to absorb ultrasonic waves traveling between the plurality of acoustic transducers and a frame of the electronic device.

7. The electronic device of claim 1, further comprising a display,
   wherein a front cover of the display comprises the plate-like member,
   wherein the plurality of acoustic transducers are arranged inside the plate-like member, and wherein a size of the measuring area is equal to or larger than a size of the display, and the plurality of acoustic transducers are located at an outer perimeter of the display.

8. The electronic device of claim 1, wherein the plate-like member comprises at least one from among glass, metal, and plastic.

9. The electronic device of claim 1, wherein the plurality of acoustic transducers comprises any one from among a piezoelectric wafer active sensor (PWAS), an electromagnetic acoustic transducer (EMAT), a magnetostrictive patch transducer (MPT), and a surface-acoustic-wave (SAW) sensor.

10. The electronic device of claim 1, wherein the transmitted signal comprises one from among a Lamb wave in a symmetric mode, a Lamb wave in an asymmetric mode, a shear-horizontal wave, and a surface wave.

11. The electronic device of claim 1, wherein the target object includes a finger, and
wherein each acoustic transducer from among the plurality of acoustic transducers is configured to transmit and receive an ultrasonic wave having a wavelength smaller than a size of a touch region of the finger and a width of a ridge of a fingerprint of the finger.

12. The electronic device of claim 1, wherein the controller is further configured to control transmission and reception of the ultrasonic guided waves of the plurality of acoustic transducers,
wherein, in response to the controller inputting the input signal to the first acoustic transducer, the first acoustic transducer is configured to transmit an ultrasonic guided wave, the second acoustic transducer is configured to receive the ultrasonic guided wave, and then the second acoustic transducer is configured to transmit a reversal ultrasonic guided wave having a time-reversed signal obtained by time-reversing the ultrasonic guided wave received by the second acoustic transducer, and then the first acoustic transducer is configured to receive the reversal ultrasonic guided wave and to obtain the reconstructed signal based on the received reversal ultrasonic guided wave.

13. The electronic device of claim 12, wherein the signal processor is further configured to obtain the touch location or the fingerprint image by a delay-sum method of the residual signal.

14. The electronic device of claim 12, wherein the signal processor is further configured to obtain the touch location or the fingerprint image by a probabilistic method of the residual signal.

15. The electronic device of claim 14, wherein the probabilistic method includes a reconstruction algorithm for probabilistic inspection of damage (RAPID).

16. An electronic device comprising:
a plurality of acoustic transducers arranged on one surface of a plate-like member, the plurality of acoustic transducers surrounding at least a portion of an outer perimeter of a measuring area of the plate-like member, the plurality of acoustic transducers being configured to transmit and receive ultrasonic guided waves;
a signal processor configured to recognize a target object touching a surface of the measuring area of the plate-like member through ultrasonic wave tomography by applying a time-reversal process with respect to a signal transmitted from at least a first acoustic transducer from among the plurality of acoustic transducers and a signal received by at least a second acoustic transducer from among the plurality of acoustic transducers; and
a controller configured to control transmission and reception of the ultrasonic guided waves of the plurality of acoustic transducers,
wherein, in response to the controller inputting an input signal to the first acoustic transducer, the first acoustic transducer is configured to transmit an ultrasonic guided wave and the second acoustic transducer is configured to receive the ultrasonic guided wave, and
wherein, in response to the second acoustic transducer receiving the ultrasonic guided wave, the signal processor is further configured to calculate a wave transfer function from a signal corresponding to the transmitted ultrasonic guided wave and a signal corresponding to the received ultrasonic guided wave, to calculate a time reversed signal based on the calculated wave transfer function, and to obtain a reconstructed signal using the calculated time reversed signal.

17. The electronic device of claim 16, wherein the signal processor is further configured to obtain a touch location or a fingerprint image by a delay-sum method of a residual signal, the residual signal being a difference between the input signal input to the first acoustic transducer and the obtained reconstructed signal.

18. The electronic device of claim 16, wherein the signal processor is further configured to obtain a touch location or a fingerprint image by a probabilistic method from a difference between the input signal input to the first acoustic transducer and the obtained reconstructed signal.

19. The electronic device of claim 18, wherein the probabilistic method includes a reconstruction algorithm for probabilistic inspection of damage (RAPID).

* * * * *